(12) United States Patent
Wallin et al.

(10) Patent No.: US 6,306,335 B1
(45) Date of Patent: Oct. 23, 2001

(54) MULLITE BODIES AND METHODS OF FORMING MULLITE BODIES

(75) Inventors: Sten A. Wallin; Arthur R. Prunier, Jr.; John R. Moyer, all of Midland, MI (US)

(73) Assignee: The Dow Chemical Company, Midland, MI (US)

( * ) Notice: Subject to any disclaimer, the term of this patent is extended or adjusted under 35 U.S.C. 154(b) by 0 days.

(21) Appl. No.: 09/384,639

(22) Filed: Aug. 27, 1999

(51) Int. Cl.$^7$ .................................................. C04B 35/185
(52) U.S. Cl. .......................... 264/643; 264/43; 55/523; 55/524; 427/376.2; 501/95; 502/355
(58) Field of Search .................................. 264/629, 630, 264/631, 643, 43; 55/523, 524; 427/376.2

(56) References Cited

U.S. PATENT DOCUMENTS

| | | | |
|---|---|---|---|
| 4,293,357 | * 10/1981 | Higuchi et al. | 264/630 |
| 4,304,585 | * 12/1981 | Oda et al. | 264/630 |
| 4,559,193 | * 12/1985 | Ogawa et al. | 264/630 |
| 4,910,172 | 3/1990 | Talmy et al. . | |
| 4,911,902 | 3/1990 | Talmy et al. . | |
| 4,948,766 | 8/1990 | Talmy et al. . | |
| 5,098,455 | 3/1992 | Doty et al. . | |
| 5,173,349 | 12/1992 | Yavuz et al. . | |
| 5,194,154 | 3/1993 | Moyer et al. . | |
| 5,198,007 | 3/1993 | Moyer et al. . | |
| 5,252,272 | 10/1993 | Yavuz et al. . | |

FOREIGN PATENT DOCUMENTS

| | | |
|---|---|---|
| 34 37 641 A1 | 4/1985 | (DE) . |
| 59 039 782 | 3/1984 | (JP) . |
| 03 141 181 | 6/1991 | (JP) . |
| 03150276 | 6/1991 | (JP) . |
| 04-65 372 | 3/1992 | (JP) . |
| 99-6-36 | 3/1992 | (JP) . |
| 4-193782 | 7/1992 | (JP) . |
| 5-58618 | 3/1993 | (JP) . |
| 05317 727 | 12/1993 | (JP) . |

* cited by examiner

*Primary Examiner*—James Derrington

(57) ABSTRACT

A mullite composition is comprised substantially of mullite grains that are essentially chemically bound wherein the composition has at least two adjoining regions that have substantially different microstructures. The composition may be produced by forming a mixture of one or more precursor compounds having the elements present in mullite; shaping the mixture into a porous green shape applying a nucleation control agent to a portion of the porous green shape and then heating the porous green shape under an atmosphere and to a temperature sufficient to form the mullite composition.

12 Claims, 2 Drawing Sheets

MULLITE BODIES AND METHODS OF FORMING MULLITE BODIES

FIELD OF THE INVENTION

The invention relates to mullite bodies and method of forming mullite bodies.

BACKGROUND OF THE INVENTION

Porous ceramic bodies have been used in a wide range of applications such as catalyst supports, filtration supports, filtration devices, and high temperature thermal insulation. Porous ceramic bodies are generally made by forming a body from ceramic powders and then heating the body to a temperature sufficient to form a uniform porous monolithic body.

In forming filters using ceramics, typically, a particulate ceramic body is formed. The body is then heated to temperature to lightly sinter the particles into a uniform monolithic body (i.e., give the body sufficient strength while still having sufficient porosity to allow the useful passage of liquid or a gas). To the lightly sintered body, a thin discriminating layer (i.e., a layer that has a smaller pore size than the lightly sintered body) of a different material is applied to a surface of the body.

For example, a dispersion of colloidal ceramic particles that sinters at a lower temperature is applied to a body already lightly sintered and this coated body is again heated to sinter the colloid particles to form a coating bonded to the lightly sintered body. One sintering step is almost never used due to cracking as a result of the support and the discriminating layer having significantly different shrinkage behavior during (e.g., shrinkage rate and temperature where shrinkage first occurs).

Recently, Moyer et al., describe forming a mullite (ceramic that has a chemistry ranging from about $3Al_2O_3 \cdot SiO_2$ to $3Al_2O_3 \cdot 2SiO_2$) into a filter (U.S. Pat. Nos. 5,194,154 and 5,198,007). Moyer et al., describe a monolithic filter of large mullite whiskers and mullite filter having a separately applied discriminating layer such as a sintered colloidal alumina coating, a polymeric organic compound or a molecular sieve (e.g., zeolites).

The process of adding a separate discriminating layer to a porous ceramic (e.g., porous mullite) requires added steps (e.g., two or more heating steps). This in turn may increase the possibility of damage due to handling and delamination of the discriminating layer as a result of insufficient bonding and mismatched thermal expansion coefficients. All of this generally leads to an increased cost of the filter and like products.

Accordingly, it would be desirable to provide both a formation method and a ceramic filter and like product that overcomes one or more of the problems of the prior art such as one of those described above.

SUMMARY OF THE INVENTION

A first aspect of the present invention is a method for preparing a mullite composition, the method comprising, a) forming a mixture of one or more precursor compounds having the elements present in mullite, b) shaping the mixture into a porous green shape c) applying a nucleation control agent to a portion of the porous green shape, d) heating the porous green shape of step (c) under an atmosphere and to a temperature sufficient to form a mullite composition comprised substantially of mullite grains that are essentially chemically bound wherein the composition has at least two adjoining regions that have substantially different microstructures.

Surprisingly the present method allows the in situ formation of a thin discriminating layer that has a much smaller pore size than the bulk of the mullite composition. The method surprisingly is also capable of forming mullite compositions that have alternating regions of differing microstructure in one or more directions throughout the composition.

A second aspect of the invention is a mullite composition comprised substantially of mullite grains that are essentially chemically bound wherein the composition has at least two adjoining regions that have substantially different microstructures.

The mullite body of the present invention may be used in any application suitable for mullite. In particular the mullite body may be used in applications requiring a body having two or more regions of differing microstructure. Examples include filters, refractories, thermal and electrical insulators, catalysts and catalyst supports.

DETAILED DESCRIPTION OF THE INVENTION

Figure 1:
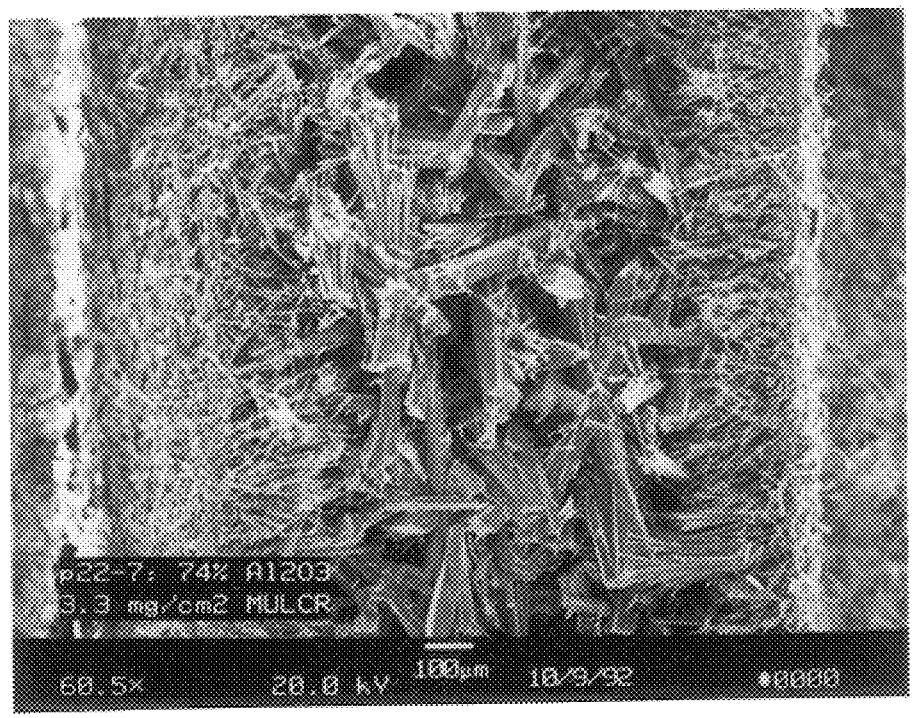
FIG. 1 is a scanning electron micrograph (magnification of about 60×) of a mullite composition of this invention made using a mullite particulate nucleation control agent.

The mullite composition is comprised substantially of mullite grains. Substantially comprised of mullite grains means that at least about 90 percent of the composition by volume is comprised of mullite grains. Preferably the mullite grains comprise at least about 95 percent, more preferably at least about 98 percent, even more preferably at least about 99 percent by volume of the composition and most preferably essentially all of the composition is mullite grains.

The mullite composition may contain filler in addition to the mullite grains. The filler is a compound that does not form mullite and fails to substantially react with mullite. Examples of fillers include graphite, metals (e.g., noble metals), metal oxides (e.g., cerium oxide) and metal sulfides (e.g., molybdenum disulfide).

Essentially all of the mullite composition's grains are chemically bound to other mullite grains of the body. This means that at most about 1 percent by volume of the mullite grains fail to be bound chemically to other mullite grains. Preferably essentially all of the mullite grains are chemically bound. Chemically bound generally is when the grains are sintered or fused together. The chemical bonding of the grains to each other allows the mullite body, even though porous, to have a sufficient strength to survive the operating conditions, for example, of a filter.

The stoichiometry of the mullite grains of the body may be any suitable stoichiometry ranging from about $3Al_2O_3 \cdot SiO_2$ to about $1.3Al_2O_3 \cdot SiO_2$ (i.e., about 3 to about 1.3). Preferably the stoichiometry is at most about 2.5, more preferably at most about 2.25 and most preferably at most about 2.1 to preferably at least about 1.4, more preferably at least about 1.5 and most preferably at least about 1.6. A most preferred embodiment is a mullite having a stoichiometry of $Al_2O_3$ to $SiO_2$ of about 1.6 to 1.85. The stoichiometry may be determined by any suitable method such as those known in the art (e.g., X-ray diffraction or electron diffraction).

Even though the grains may have any morphology that mullite can assume, it is preferred that at least some of the grains are whiskers. More preferably at least one region is comprised of mullite whiskers. Whiskers means grains that have an aspect ratio of greater than about 2 (e.g., length twice as great as width). Generally, at least one of the regions is comprised of whiskers having an average aspect ratio greater than about 10. Preferably all of the regions in the mullite body are comprised of whiskers.

The mullite body also has at least two adjoining regions that have substantially different microstructures. Different microstructures means that one of the adjoining regions has at least one characteristic selected from the group consisting of: average pore size, grain morphology (e.g., average aspect ratio), grain size (e.g., equivalent spherical diameter) and density that is at least 25 percent different than the other adjoining region. Preferably the microstructure is at least about 50 percent different, more preferably at least 100 percent, even more preferably at least 500 percent and most preferably at least 1000 percent different. Each of the characteristics may be determined by a suitable technique such as those known in the art (e.g., electron microscopy of polished sections).

Generally a region is a volume of the composition that is readily apparent such as a volume that has dimensions in at least two directions orthogonal to each other of at least 10 times greater than the smallest average equivalent spherical diameter grain size of the entire composition. An example of a region is a layer on the surface of a composition (e.g., discriminating layer).

The adjoining different regions may surprisingly have a narrow interfacial region. For example, the interface between the regions, generally, is at most about 2 mm. Preferably, in ascending preference, the interface is at most about 1 mm, at most about 0.75 mm, at most 0.5 mm, 0.25 mm, 0.1 mm, 50 micrometers and most preferably at most 25 micrometers.

The interface length and width, herein, are defined by the plane formed by the contact between adjoining regions. The thickness of the interface is the distance measured orthogonal to the length and width of the interface. For example, when measuring the interface thickness beginning from one region to the other, the interface thickness is the distance starting at a point where at least one microstructural property, such as grain size is about 10 percent different than the bulk property of a region to a point where the same property is about 10 percent different than it is in the bulk of the adjoining region.

The measurement or measurements of microstructure may be made on a polished section. For example, the average mullite grain size may be determined from a scanning electron micrograph (SEM) of a polished section of the body, wherein the average grain size may be determined by the intercept method described by Underwood in *Quantitative Stereology*, Addison Wesley, Reading, Mass., (1970).

A preferred embodiment of the mullite composition has two regions adjoining each other where one of the layers has an average pore size that is an order of magnitude less and each of the regions is comprised of whiskers. It is also preferred that the whiskers of the region with the smaller pore size have an average grain size at least about an order of magnitude smaller than the other region. Finally, it is preferred that both regions are comprised of mullite whiskers that have a stoichiometry between 1.5 and 2.

Another preferred embodiment is a composition comprised of mullite whiskers that has a bottom region, a top region and a middle region interposed between the top and bottom region wherein the middle region is different than the top and bottom regions. Preferably the top and bottom regions are not different as described herein. It also preferred that the middle region has an average equivalent grain size that is an order of magnitude smaller or larger than the average grain size of the top and bottom regions.

The total amount of impurities (i.e., elements other than those present in the mullite formula shown above) present in the body is generally at most about 5 percent by weight of the body. Preferably, the total amount of impurities is at most about 1 percent, more preferably at most about 0.5 percent, even more preferably at most about 0.1 percent and most preferably there is essentially no impurities (i.e., trace amounts) present in the mullite body. The amount of impurities may be determined by any suitable bulk analysis technique such as those known in the art (e.g., X-ray fluorescence).

In making the mullite composition, precursor compounds containing Al, Si and oxygen are mixed to form a mixture capable of forming mullite. Precursor compounds that may be used are described in U.S. Pat. Nos. 5,194,154; 5,198,007; 5,173,349; 4,911,902; 5,252,272; 4,948,766 and 4,910,172 each incorporated herein by reference. The mixture may also contain other compounds such as fillers (described previously) and organic compounds to facilitate the shaping of the mixture (e.g., binders and dispersants such as those described in *Introduction to the Principles of Ceramic Processing*, J. Reed, Wiley Interscience, 1988). Generally, the mixture is comprised of compounds such as clay (i.e., hydrated aluminum silicate), alumina, silica, aluminum trifluoride, fluorotopaz and zeolites. Preferably, the precursor compounds are selected from the group consisting of clay, silica, alumina and mixtures thereof. Most preferably the mixture is comprised of clay and alumina.

The precursor compounds are generally selected in proportions so that mullite may be made with any stoichiometry from about 1.3 to about 3 as described above.

The mixture may be made by any suitable method such as those known in the art. Examples include ball milling ribbon blending, vertical screw mixing, V-blending and attrition milling. The mixture may be prepared dry (i.e., in the absence of a liquid medium) or wet.

The mixture is then shaped into a porous shape by any suitable method such as those known in the art. Examples include injection molding, extrusion, isostatic pressing, slip casting, roll compaction and tape casting. Each of these is described in more detail in *Introduction to the Principles of Ceramic Processing*, J. Reed, Chapters 20 and 21, Wiley Interscience, 1988.

To a portion of the porous shape, a nucleation control agent is applied. Generally, a portion means the nucleation control agent is applied to the surface of the porous body. The nucleation control agent may either suppress or accentuate the nucleation of mullite. The control agent generally is a solid particulate applied to the shaped porous body prior to the heating of the porous body. Examples of nucleation control agents include particulates that have the same chemistry of the mixture except that the control agent particles are either substantially larger or substantially smaller than those in the mixture. Substantially larger or smaller means the average particle size is at least about an order of magnitude different than the average size of the particles in the mixture. The control agent may also be mullite particles. Preferably the nucleation control agent is mullite particles.

The nucleation control agent may be applied by any convenient method such as dipping, spraying and painting. The nucleation control agent may be combined with other material prior to application such as precursor compounds and organic compounds described previously. The nucleation control agent may also be formed into a shaped body and applied by mechanical force to the porous shaped body (e.g., laminate the porous body to the shaped body containing the control agent by pressing together). That is to say, the nucleation control agent may be blended with precursor and that mixture layered by methods such as tape calendaring, co-extrusion, dipping, spraying, painting, upon a precursor lacking the nucleation control agent to form a porous body having regions with and without nucleation control agent.

The final step of the process is the heating of the porous green shape of step (c) under an atmosphere and a temperature sufficient to form the mullite composition. Desirably, at least during some portion of the heating, fluorine is present in the gaseous atmosphere from sources such as $SiF_4$, $AlF_3$, $HFNa_2$, $SiF_6NaF$ and $NH_4F$. Preferably the source of fluorine, when used in the atmosphere, is from $SiF_4$.

The porous body is preferably heated to a first temperature for a time sufficient to convert the precursor compounds in the porous body to fluorotopaz and then raised to a second temperature sufficient to form the mullite composition. The temperature may also be cycled between the first and second temperature to ensure complete mullite formation. The first temperature may be from about 500° C. to about 950° C. Preferably the first temperature is at least about 550° C., more preferably at least about 650° C. and most preferably at least about 725° C. to preferably at most about 850° C., more preferably at most about 800° C. and most preferably at most about 775° C.

The second temperature may be any temperature suitable depending on variables such as the partial pressure of $SiF_4$. Generally the second temperature is at least about 1000° C. to at most about 1700° C. Preferably the second temperature is at least about 1050° C., more preferably at least about 1075° C. and most preferably at least about 1100° C. to preferably at most about 1600° C., more preferably at most about 1400° C. and most preferably at most about 1200° C.

Generally, during the heating to the first temperature, the atmosphere is inert (e.g., nitrogen) or a vacuum until at least about 500° C. which is when the fluorine containing gas is desirably introduced. During heating to the first temperature, organic compounds and water may be removed. These may also be removed in a separate heating step common in the art described in *Introduction to the Principles of Ceramic Processing*, J. Reed, Wiley Interscience, 1988.

The mullite composition may be particularly useful as a support for a catalyst such as precious metal catalyst on alumina particles, typically referred to as a catalyst wash coat, used in automotive catalytic converters. It is preferred that the mullite grains are whiskers. It is also preferred that the wash coat makes a thin coating on at least a portion of the mullite grains. A portion is generally when at least about 10 percent of the area of the grains of one region are covered by the catalyst coating. Preferably substantially all of the grains of one region are coated. More preferably substantially all of the grains of the composition are coated.

Thin coating means that the catalyst wash coating has a thickness generally less than the average smallest dimension of the grains coated. Generally the thickness of the coating is at most about half the thickness, preferably at most about one third and most preferably at most about one quarter the thickness of the average smallest dimension of the grains coated.

The composition may also be particularly useful as a particulate (soot) trap and oxidation (i.e., exhaust) catalyst for mobile power applications (e.g., diesel engines) and stationary power applications (e.g., power plants). As above, the mullite composition would have at least a portion of the mullite grains coated with a catalyst, but preferably, there will be a coating on substantially all the grains of the composition. The coated mullite composition would then be placed, for example, in a diesel exhaust system so that the gas passes through the composition. In such an arrangement, the soot particles generally would be trapped on a region having a porosity of smaller size and the exhaust gas would typically be catalyzed in a region having a porosity of larger size. Since the soot particles are retained at the catalyst, surprisingly, the soot particles may be combusted as the catalyst heats up to operating temperature and the subsequent gases produced catalyzed just as the exhaust gases are.

EXAMPLES

Example 1

A disk was pressed from a precursor having a mullite stoichiometry of about 1.67 made by mixing 25.1 parts by weight of ball clay (Todd Dark grade, Kentucky-Tennessee Clay Company, Mayfield, Ky.) with 27.6 parts by weight of κ-alumina, 1.5 parts of hydroxypropyl methylcellulose (METHOCEL™ J75MS-N, The Dow Chemical Company, Midland, Mich.) and 25 parts deionized water. The ball clay was dried for 48 hours at 110° C. before use. The κ-alumina was prepared by heating aluminum hydroxide (HYDRAL™ 710, Alcoa, Pittsburgh, Pa.) to 1000° C. for 1 hour. The disk was bisque-fired to remove the organic binder (i.e., METHOCEL™) and to dehydrate the clay under the is following schedule: heat from ambient to 115° C. at 1° C./min, 115° C. to 350° C. at 3° C./min, 350° C. to 600° C. at 5° C./min, hold at 600° C. for 3 hours, heat from 600° C. to 1025° C. at 7° C./min, hold at 1025° C. for 1 hour, cool to ambient temperature at 10° C./min.

The bisque-fired disk was then coated with a dispersion of mullite powder to form a surface layer of a nucleation control agent. The mullite dispersion was prepared by adding 17 grams of mullite powder (MULCR, Biakowski International, Charlotte, N.C.) to 100 mL of a 0.2 weight percent solution of DARVAN™ 821 (R. T. Vanderbilt Company, Norwalk, Conn.) in deionized water. The disk was dipped into the dispersion for 60 seconds, then removed, air dried and then bisque-fired according to the schedule given above.

The disk was then placed in a quartz tube lined with nickel foil contained within a furnace. The disk was heated under vacuum to 950° C., then cooled under vacuum to 640° C. At this point, $SiF_4$ gas was introduced into the tube until a pressure of about 750 torr was obtained. The temperature was maintained at 640° C. for 1 hour. The tube was then heated at 4° C./min to 1015° C., then the heating rate was reduced to 1° C./min. When the temperature reached about 1020° C., the gas pressure in the tube was momentarily reduced to about 100 torr and allowed to rise to about 550 torr, at which point the gas was removed at a rate sufficient to maintain 550 torr pressure. When the evolution of SiF$_4$ substantially ceased (T=about 1084° C.), the disk was placed under vacuum and cooled to ambient temperature. An SEM photomicrograph of the mullite composition of this Example is shown in FIG. 1.

Comparative Example 1

Figure 2:
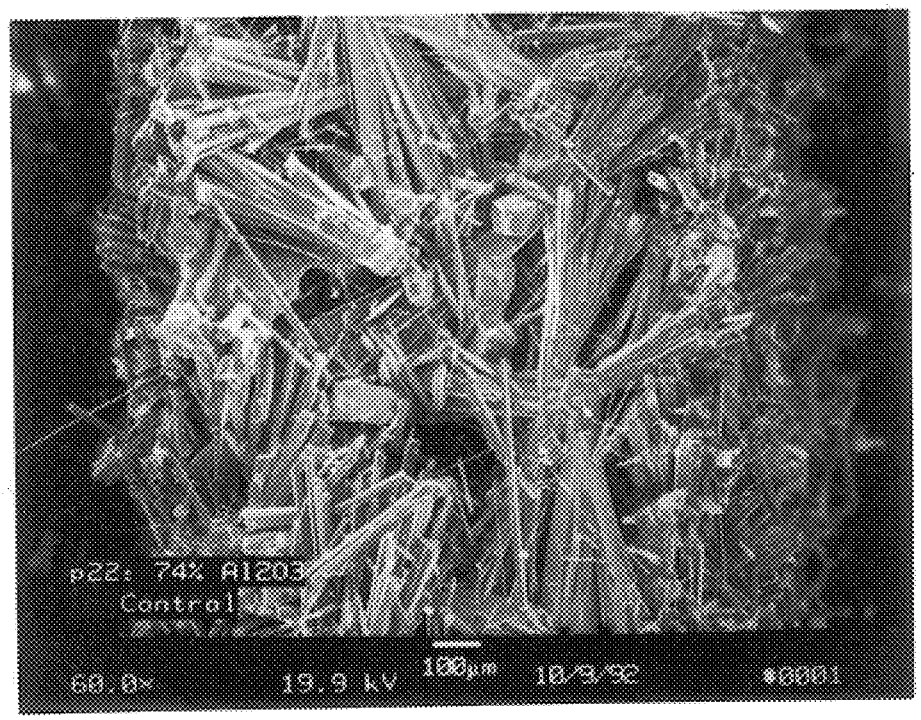
FIG. 2 is a scanning electron micrograph (magnification of about 60×) of a mullite composition not of this invention made in the absence of any nucleation control agent.

A disk was formed in the same manner as in Example 1 except that no nucleation control agent (i.e., mullite powder) was applied to the disk. This disk lacking nucleation control agent was heated and converted to mullite concurrently with the disk of Example 1. An SEM photomicrograph of the mullite disk of this comparative Example is shown in FIG. 2.

Example 2

A disk was pressed of a ball clay (Todd Dark grade, Kentucky-Tennessee Clay Company, Mayfield, Ky.) and κ-alumina mixture similar to that described in Example 1. After bisque firing for 1 hour at 1000° C., the disk was coated with mullite powder as follows. A dispersion was prepared by adding 0.431 grams of mullite powder (MULCR, watts . Approximately 0.8 mL of the dispersion was applied to one face of the disk with an eye dropper and allowed to dry while continuously rotating the disk gently in a circular motion.

Figure 3:
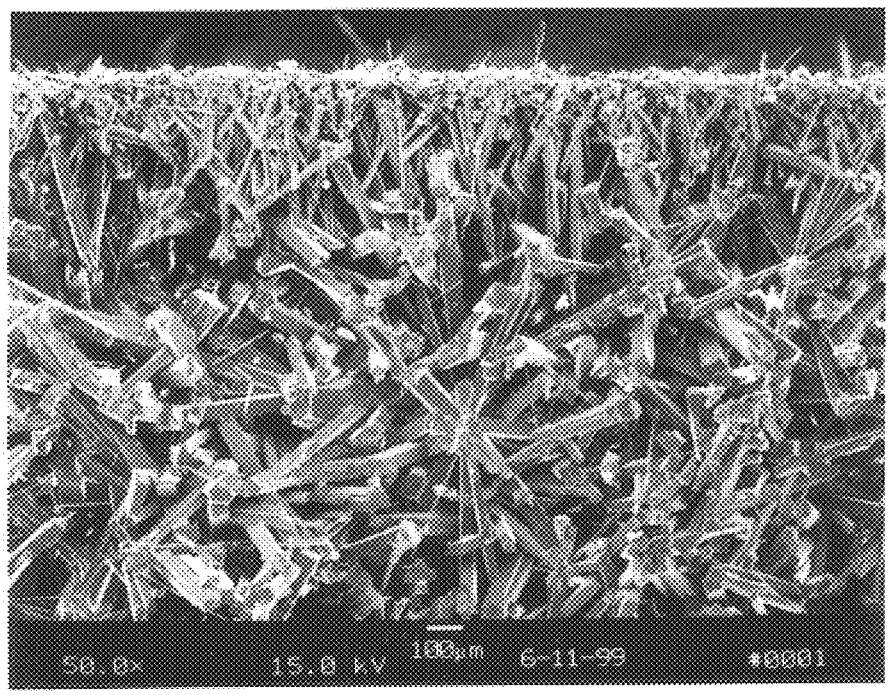
FIG. 3 is a scanning electron micrograph (magnification of about 50×) of a mullite composition of this invention made using a mullite particulate nucleation control agent.

The disk was dried for 1 hour at 100° C. and then transferred to a tube similar to that described in Example 1. The disk was heated under vacuum to 700° C. and held at that temperature for 2 hours, then cooled under vacuum to 675° C. At this point, SiF$_4$ gas was added until a pressure of 600 torr was obtained and the disk was then heated at 1° C./min to 680° C. While maintaining a constant pressure of 600 torr, the disk was heated at 3° C./min to 1040° C., then 1° C./min to 1075° C. From that point on, the temperature was manually raised in 1° C. increments to slowly approach the point at which significant SiF$_4$ evolution began (about 1082° C.). The temperature was slowly raised and gas was removed from the reactor at a rate sufficient to maintain a constant pressure of about 600 torr. When the evolution of SiF$_4$ substantially ceased (T=about 1104° C.), the reactor was evacuated and cooled to ambient temperature. An SEM photomicrograph of the resultant mullite of this Example is shown in FIG. 3.

Example 3

A tube was extruded of a ball clay (Todd Dark grade, Kentucky-Tennessee Clay Company, Mayfield, Ky.) and κ-alumina mixture similar to that described in Example 1. After bisque firing for 1 hour at 1050° C., the tube was converted to fluorotopaz as follows: heat to 950° C. under vacuum, then cool under vacuum to 650° C. SiF$_4$ gas was then introduced to a pressure of 730 torr and allowed to react at 650° C. for 2 hours and 40 min. The reactor was then evacuated and cooled to ambient temperature. The tube had now been converted to fluortopaz.

Figure 4:
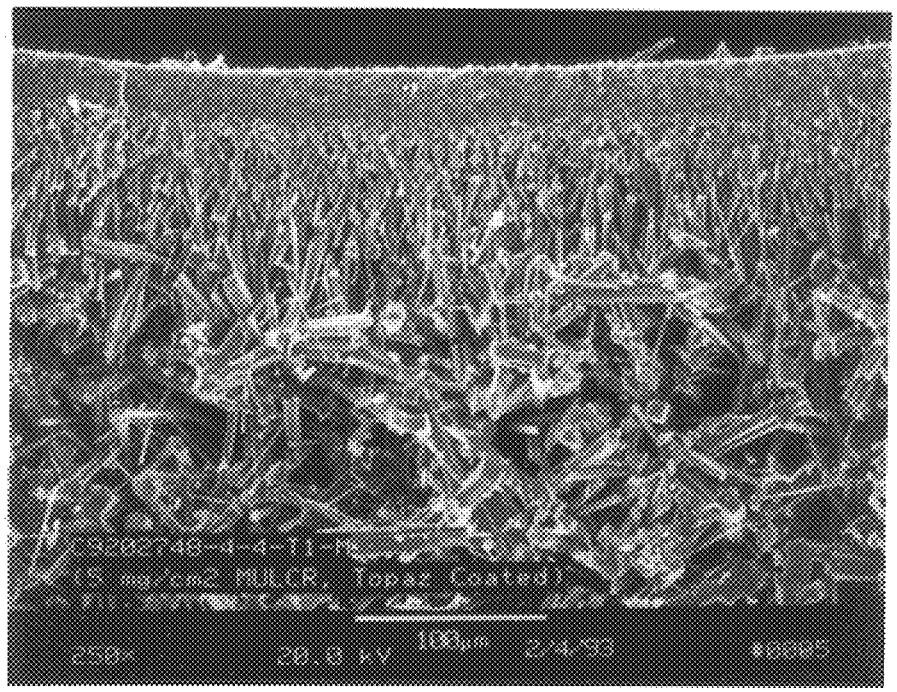
FIG. 4 is a scanning electron micrograph (magnification of about 250×) of a mullite composition of this invention made using a mullite particulate nucleation control agent.

A layer of mullite powder (MULCR, Biakowski International, Mayfield, Ky.) was deposited on the inside of the tube of fluorotopaz by exposing, for a short period of time, the inside of the tube with a slip containing 4 percent by weight of MULCR mullite powder prepared in a manner similar to that described in Example 1. After drying overnight at 120° C., the tube was fired at 550° C. for 1 hour. The tube was then heated under vacuum at 10° C./min to 650° C., then heated at 4° C./min to 1015° C., 1° C./min to 1040° C., the temperature was then held at 1040° C. for 40 min, then heated at 1° C./min until the evolution of SiF$_4$ reached 0.43 SCCM per gram of topaz. The temperature was increased during the run to maintain a constant rate of SiF$_4$ evolution at a constant pressure of 580 torr until the reaction was complete. The reactor was then evacuated and cooled to ambient temperature. An SEM photomicrograph of the resultant mullite tube of this Example is shown in FIG. 4.

What is claimed is:

1. A method for preparing a mullite composition comprising,
    a) forming a mixture of one or more precursor compounds having the elements present in mullite,
    b) shaping the mixture into a porous green shape,
    c) applying a nucleation control agent that either suppresses or accentuates the nucleation of mullite to a portion of the porous green shape, and
    d) heating the porous green shape of step (c) under an atmosphere and to a temperature sufficient to form a mullite composition comprised substantially of mullite grains that are essentially chemically bound, wherein the composition has at least two adjoining regions that have substantially different microstructures.

2. The method of claim 1 wherein the precursor compounds are selected from the group consisting of clay, alumina, silica, fluorotopaz, zeolite, AlF$_3$ and mixtures thereof.

3. The method of claim 2 wherein the precursor compound is selected from the group consisting of clay, alumina, silica, fluorotopaz, zeolite, and mixtures thereof.

4. The method of claim 3 wherein the precursor compounds are a mixture of alumina and clay.

5. The method of claim 1 wherein the nucleation control agent is a solid particulate.

6. The method of claim 5 wherein the solid particulate is mullite, a precursor compound having an average particle size an order of magnitude different than the average particle size of the precursor compounds in the porous body or mixtures thereof.

7. The method of claim 6 wherein the solid particulate is mullite.

8. The method of claim 1 wherein the heating is to a first temperature and then to a second higher temperature wherein fluorotopaz is formed at the first temperature and the mullite is formed at the second higher temperature.

9. The method of claim 8 wherein the fluorotopaz formed at the first temperature is formed in an atmosphere comprised of SiF$_4$.

10. The method of claim 8 wherein the first temperature is from about 500° C. to about 950° C.

11. The method of claim 10 wherein the first temperature is at least 725° C. to about 750° C.

12. The method of claim 11 wherein the second temperature is at least about 1000° C. to at most about 1300° C.

* * * * *